July 9, 1940.　　R. A. GOEPFRICH　　2,207,172
BRAKE
Filed Jan. 7, 1937
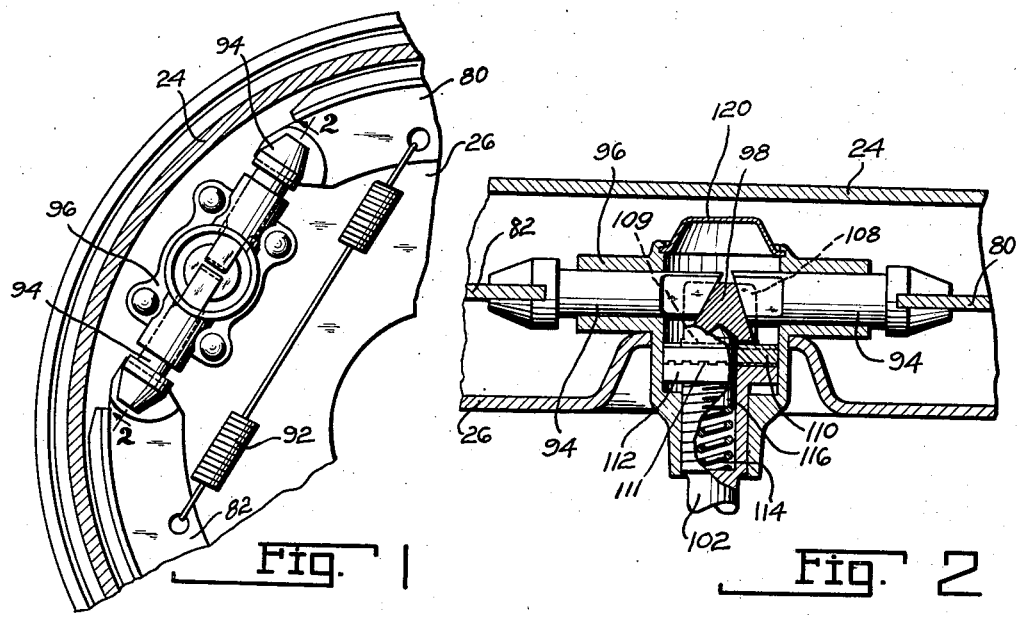
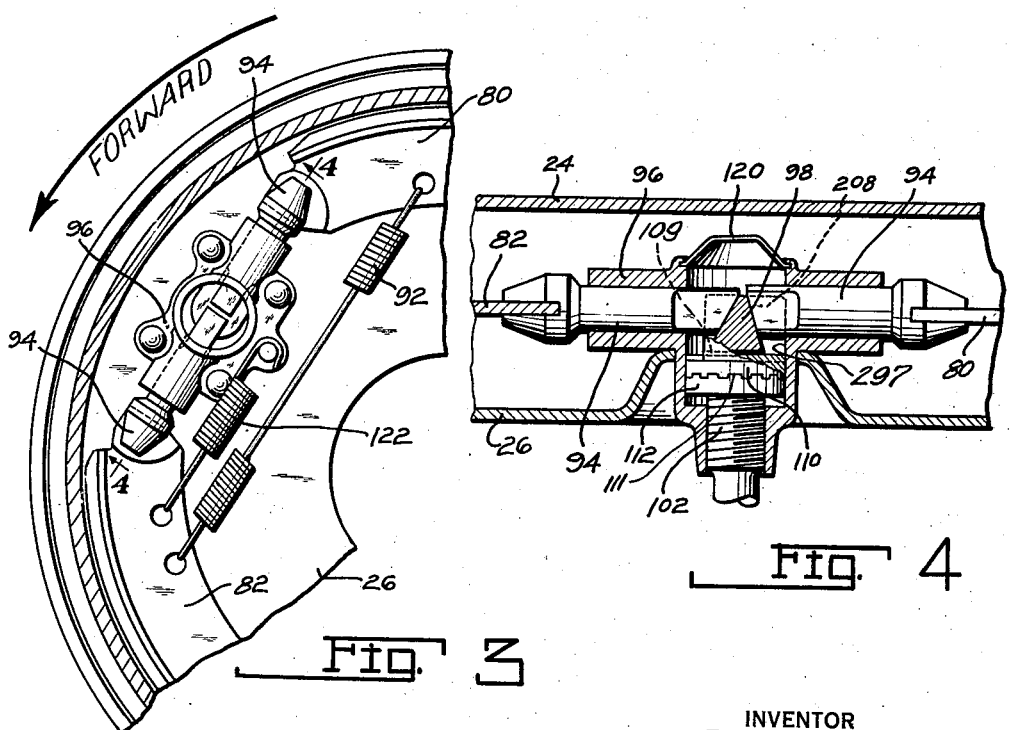
INVENTOR
RUDOLPH A. GOEPFRICH
BY
ATTORNEY Patented July 9, 1940

2,207,172

UNITED STATES PATENT OFFICE 2,207,172

BRAKE

Rudolph A. Goepfrich, South Bend, Ind., assignor to Bendix Products Corporation, South Bend, Ind., a corporation of Indiana Application January 7, 1937, Serial No. 119,382

3 Claims. (Cl. 188—79.5)

This invention relates to brakes, and is illustrated as embodied in an internal expanding brake for an automobile.

An object of the invention is to provide adjusting means connecting the shoes of the brake and which will adjust one of the shoes faster than the other, to compensate for the fact that the lining of the shoe which does most of the work in forward braking wears down much faster than the lining of the other shoe.

In one desirable arrangement, the connection between the shoes includes plungers arranged end to end, with their adjacent ends formed with converging wedge surfaces sloping at different angles. Thus by crowding a thrust member between these surfaces the shoes are wedged apart at the desired different rates.

Another feature of the invention relates to arranging an adjustment of this type so that in forward braking the brake acts as a servo brake, the one shoe operating the other, while in reverse braking the shoes are anchored on the adjustment.

The above and other objects and features of the invention, including various novel combinations of parts and desirable particular arrangements, will be apparent from the following description of the illustrative embodiments shown in the accompanying drawing, in which:

Figure 1 is a partial section through a brake embodying the invention, in a plane just inside the head of the backing plate, and showing the connected ends of the shoes in side elevation;

Figure 2 is a partial section therethrough on the line 2—2 of Figure 1;

Figure 3 is a partial section corresponding to Figure 1, but showing a different embodiment; and Figure 4 is a partial section therethrough on the line 4—4 of Figure 3.

The invention is illustrated as embodied in a brake of the type fully illustrated and described in Patent No. 2,045,010, granted Bendix Aviation Corporation June 23, 1936, on an application filed by me December 1, 1932. Where the parts illustrated herein are the same as, or analogous to, those shown in the patent the reference characters of the patent are used herein.

The brake illustrated includes a rotatable drum 24, at the open side of which is a support such as a backing plate 26, and within which are arranged brake shoes 80 and 82. The brake is provided with suitable anchorage and applying means, positioning stops, return springs, and steady rests, as described in said Patent No. 2,045,010. A spring 92 may be tensioned between the shoes to hold them against the plungers described below.

The webs of the shoes 80 and 82 are held by spring 92 seated in slots formed crosswise of heads on the ends of alined plungers 94 arranged end to end for sliding movement in cylindrical passages in a support or bracket 96 secured to the backing plate by suitable fastening devices. The adjacent inner ends of the plungers 94 are beveled to form converging wedge surfaces, one of these surfaces sloping at a different angle than the other so that one shoe is adjusted faster than the other as explained above.

Between the plungers 94 is a wedge thrust member 98 having correspondingly-sloping wedge faces, and which is formed as an integral part of a generally-cubical block 108 movably arranged in the bracket 96. The rectangular base of block 108 is formed with a groove or keyway 109 extending circumferentially of the brake and paralleling the plungers 94 and embracing a corresponding rib on a plate 110. This plate is provided with radial grooves 111 on its opposite face for yielding interlocking engagement with corresponding ridges on the face of the head 112 of an adjusting member 102 threaded through a boss in the side of the bracket 96, and which is therefore operable from outside the brake.

The stem 102 may be provided with a socket for a spring 114 acting on a centering plunger 116. This plunger is conical at its end, seating in a conical recess in the base of the block 108, and is forced down by the shifting of the block 108 when the brake is applied. When the brake is released the plunger 116 returns the block 108 to a centered position.

The opening in the bracket 96 through which the parts are assembled is shown closed by a suitable stamping 120.

The embodiment of Figures 3 and 4 differs from that described above principally in that block 208, carrying the wedge 98, is large enough so that one side (at the right in Figure 4) normally seats against the side wall 297 of the opening in the bracket 96 which contains the adjusting parts. Thus the block 208 is free to shift to the left in Figure 4, but not to the right.

Therefore, in forward braking the shoe 80 applies the shoe 82 through the wedge 98, with a servo action, the anchorage being at the opposite side of the brake as described in Patent No. 2,045,010, whereas in reverse braking (since block 208 cannot shift) the bracket 96 forms the anchorage for the brake.

Preferably there is a spring 122 tensioned between shoe 82 and the backing plate, to hold the block 208 yieldingly in the anchored position of Figure 4.

While two illustrative embodiments have been described in detail, it is not my intention to limit the scope of the invention to those particular embodiments, or otherwise than by the terms of the appended claims.

I claim:

1. A brake having shoes provided with a shiftable connection including a pair of plungers arranged end to end and engaging the shoes respectively, means for guiding said plungers, and a member between the adjacent ends of said plungers, said member and said ends having surfaces in wedging engagement and with the surface on one plunger at a different angle from that on the other, so that crowding said member between said surfaces wedges the shoes apart with one moved further than the other, in combination with means carried by the guiding means and operable to crowd said member between said plungers, said crowding means having a yielding centering device acting on said member.

2. A brake having shoes provided with a shiftable connection including a pair of plungers arranged end to end and engaging the shoes respectively, means for guiding said plungers, and a member between the adjacent ends of said plungers, said member and said ends having surfaces in wedging engagement and with the surface on one plunger at a different angle from that on the other, so that crowding said member between said surfaces wedges the shoes apart with one moved further than the other, in combination with means carried by the guiding means and operable to crowd said member between said plungers, and a yielding centering device acting on said member.

3. A brake having shoes provided with a shiftable connection including a pair of plungers arranged end to end and engaging the shoes respectively, means for guiding said plungers, and a member between the adjacent ends of said plungers, said member and said ends having surfaces in wedging engagement and with the surface on one plunger at a different angle from that on the other, so that crowding said member between said surfaces wedges the shoes apart with one moved further than the other, in combination with a member carried by and having a stem threaded into the guiding means and having a head engaging said member and operable to crowd said member between said plungers, said stem having a socket formed therein and provided with a centering plunger acting on said member.

RUDOLPH A. GOEPFRICH.